US008412629B2

(12) United States Patent
Masi (10) Patent No.: US 8,412,629 B2
(45) Date of Patent: *Apr. 2, 2013

(54) NON-CASH TRANSACTION INCENTIVE AND COMMISSION DISTRIBUTION SYSTEM

(76) Inventor: Larry A. Masi, Egg Harbor Township, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/206,412

(22) Filed: Aug. 9, 2011

(65) Prior Publication Data

US 2012/0010940 A1  Jan. 12, 2012

Related U.S. Application Data

(63) Continuation-in-part of application No. 12/346,526, filed on Dec. 30, 2008, now Pat. No. 8,001,048, which is a continuation-in-part of application No. 09/639,628, filed on Aug. 15, 2000, now Pat. No. 7,472,073, which is a continuation-in-part of application No. 08/912,214, filed on Aug. 15, 1997, now Pat. No. 6,105,001.

(51) Int. Cl.
*G06Q 30/00* (2006.01)

(52) U.S. Cl. ............... 705/41; 705/26; 705/27; 705/35; 705/36; 705/37; 705/39; 705/40

(58) Field of Classification Search ............ 705/26, 705/27, 35, 36, 37, 39, 40, 41
See application file for complete search history.

(56) References Cited

U.S. PATENT DOCUMENTS

| 4,594,663 | A | 6/1986 | Nagata et al. |
| 4,750,119 | A | 6/1988 | Cohen et al. |
| 4,941,090 | A | 7/1990 | McCarthy |
| 5,025,372 | A | 6/1991 | Burton et al. |
| 5,117,355 | A | 5/1992 | McCarthy |
| 5,222,018 | A | 6/1993 | Sharpe et al. |
| 5,287,268 | A | 2/1994 | McCarthy |
| 5,537,314 | A | 7/1996 | Kanter |
| 5,734,838 | A | 3/1998 | Robinson et al. |
| 5,826,241 | A | 10/1998 | Stein et al. |
| 6,105,001 | A | 8/2000 | Masi et al. |
| 6,134,533 | A * | 10/2000 | Shell ......................... 705/26.82 |
| 6,421,648 | B1 * | 7/2002 | Gagnon et al. ................ 705/1.1 |
| 6,581,041 | B1 | 6/2003 | Canney |
| 8,001,048 | B2 * | 8/2011 | Masi ............................... 705/41 |

OTHER PUBLICATIONS

Paul-André Pays, "An intermediation and payment system technology" from *Computer Networks & ISDN Systems* 28 (1996) 1197-1206.
Talila Baron, "Banks, vendors focus on security," cited in "Abstracts of Recent Articles and Literature," by Helen Collinson in *Computers & Security*, 14 (1995), 409-414.

(Continued)

*Primary Examiner* — Nga B. Nguyen
(74) *Attorney, Agent, or Firm* — Paul & Paul (57) ABSTRACT

An electronic fund transfer system is disclosed wherein commissions for point-of-sale purchase transactions are determined and distributed to members of an organizational network for promoting use of a non-cash payment device that is tangible for effecting purchase transactions. Purchase data is electronically transmitted from the point-of-sale to an automated clearing house for effecting fund transfers to prepare the purchase, and also to a commission management system. The commission management system maintains an electronic database reflecting the structure of the organizational network, and further determines the distribution of purchase commissions according to a predetermined schedule of proportions relating to the position and business volume of each member of the network. The commission management system further comprises a payment processor for effecting commission payments to the members or to a designated sponsor on a scheduled basis.

25 Claims, 4 Drawing Sheets

OTHER PUBLICATIONS

Amway USA "The Amway Opportunity in the USA—Questions & Answers" from http://www.amway-usa.com/info/q&a.asp, (1998).

6 sheets listing articles which disclose incentive rebates linking to the use of GM credit card (From Dialog Search including publishing dates, title, source of the article, & related paragraph), fr. 1985.

John Corry, "The Amway way: Seeking the profit of many" (a review of *An Enterprising Life: An Autobiography by Jay Van Andel*) from *The American Spectator*; Bloomington; vol. 31, Issue 10; p. 1-12, Oct. 1998.

Matthew Rock, "This article could make you a millionaire," from *Institute of Directors*, London; vol. 48, Issue 7, p. 1-4, Feb. 1995.

* cited by examiner

NON-CASH TRANSACTION INCENTIVE AND COMMISSION DISTRIBUTION SYSTEM

CROSS-REFERENCE TO RELATED APPLICATIONS

This application is a continuation-in-part application filed under 35 U.S.C. Section 120 of U.S. patent application Ser. No. 12/346,526, filed Dec. 30, 2008, which is a continuation-in-part of U.S. patent application Ser. No. 09/639,628, filed Aug. 15, 2000, and which issued as U.S. Pat. No. 7,472,073 on Dec. 30, 2008, and which in turn is a continuation-in-part application filed under 35 U.S.C. Section 120 of U.S. patent application Ser. No. 08/912,214, filed Aug. 15, 1997, and which issued as U.S. Pat. No. 6,105,001 on Aug. 15, 2000.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION (1). Field of the Invention

The present invention relates to non-cash point-of-sale transaction systems for managing purchase transactions and for distributing of purchase commissions among distributors and users of non-cash point-of-sale transaction systems.

Non-cash payment devices, such as debit cards or credit cards, provide substantial convenience to purchasers of goods or services. However, such payment devices require electronic transaction management and accounting systems which incur operating expenses above the cost of goods and services purchased with such devices. Traditionally, issuers of non-cash payment devices have entered into merchant agreements whereby participating merchants pay commissions to the card issuers in exchange for providing customers with the convenience of using non-cash payment devices. More recently, competition among card issuers has decreased the commission rates that merchants are willing to pay. Consequently, card issuers have attempted to increase the transaction volume by providing various incentives to their customers and by aggressive commercial promotion of such incentives.

(2). Description of Related Art, Including Information Disclosed under 37 C.F.R. Sections 1.97 and 1.98

In one known incentive program, such as described in U.S. Pat. No. 4,941,090 to McCarthy, customers are paid personal bonuses based upon the amount of personal purchases made with their non-cash payment device. Although such an incentive program is attractive to individual customers, such a program also must be promoted effectively to advertise the program and to attract potential customers. Additionally, these incentive programs provide no particular advantage to the participating merchants, who still must be enrolled on a commission basis competitive with other non-cash payment systems. Therefore, it would be desirable to develop a non-cash payment system that provides incentives for customers to use the system in preference to other non-cash payment systems that would provide enrollment incentives to merchants, and would reduce promotional costs associated with attracting and maintaining cardholders.

BRIEF SUMMARY OF THE INVENTION

In accordance with the present invention, a commission payment and accounting system organizes transaction data pertaining to holders of a non-cash payment device, such as a debit card or credit card, into a hierarchical database reflecting the organizational structure of an incentive program for using the debit cards and for enlisting new cardholders. Commissions on purchases are electronically transferred to the card issuer, and the commission payment and accounting system is configured to determine and dispense commission payments to cardholders according to the stored electronic funds transaction data, the organizational relationships among cardholders, and a predetermined schedule associating proportional commission rates with defined organizational relationships.

BRIEF DESCRIPTION OF THE SEVERAL VIEWS OF THE DRAWINGS

The foregoing summary, as well as the following detailed description, will best be understood in conjunction with the attached drawings in which.

DETAILED DESCRIPTION OF THE INVENTION

Figure 1:
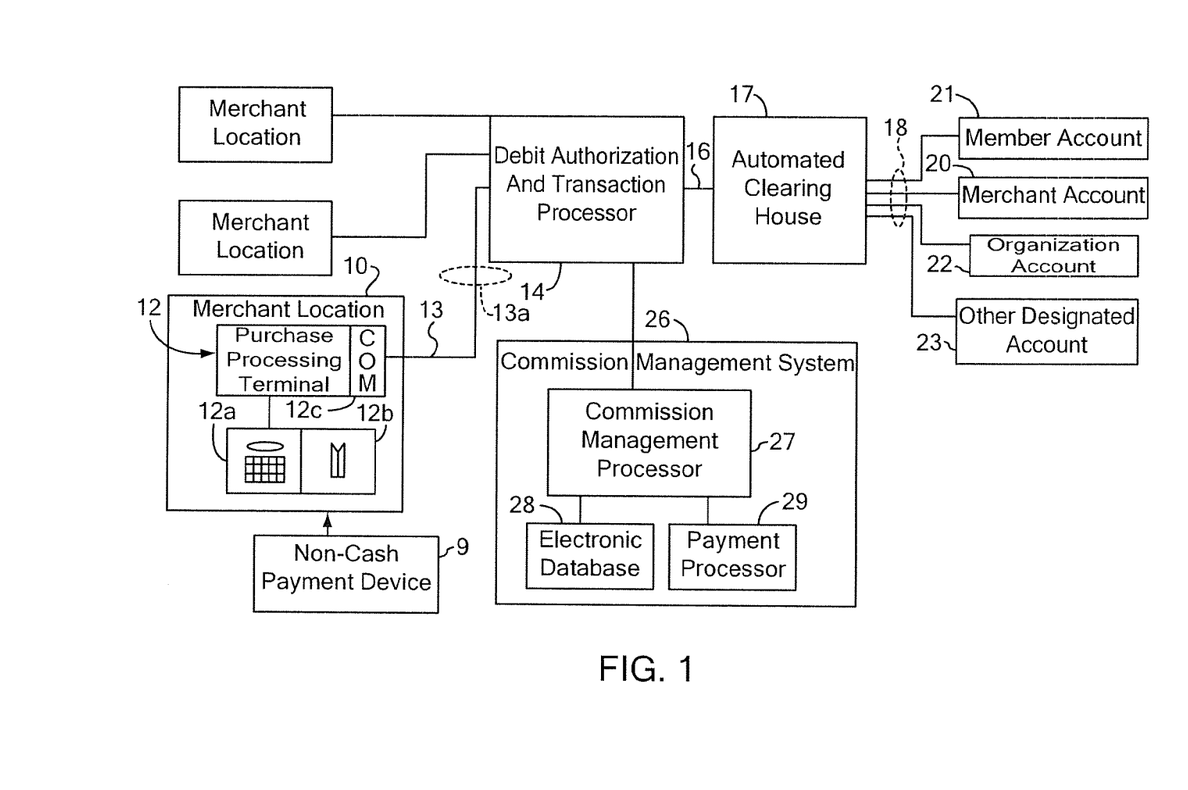
FIG. 1 is a functional block diagram of a transaction system according to a preferred embodiment of the invention.

Referring now to FIG. 1, there is shown an exemplary non-cash payment and commission system according to the invention. The system is adapted for managing purchases of goods or services by members (i.e., persons or distributors) of a network marketing, or multilevel marketing organization, and for managing payment of commissions to members of the organization according to a hierarchical commission accounting and payment method. As described further herebelow, each member is provided with a non-cash payment device 9. The device is tangible, i.e., capable of being grasped with the mind or hands. Examples of tangible devices capable of being grasped with the mind are a computer database, an online membership, an online bank account and a reward membership. Examples of tangible devices capable of being grasped with the hand are things made or adapted to transmit a purchase or payment such as a debit or credit card, a smart card with or without a chip, a hand-held device such as a cellular phone, a portable transmitter, a voucher or a loyalty card. The non-cash payment devices can be used individually or in combination. An example of a combination of non-cash payment devices is an online membership and any one or more of a computer database, an online bank account, a reward membership, a debit or credit card, a smart card with or without a chip and a hand-held device such as a cellular phone, a portable transmitter, a voucher and a loyalty card. Another example of a combination of non-cash payment devices is a cellular phone and a credit card and/or a loyalty card. A further example of a combination of non-cash payment devices is at least one of a cellular phone or wireless device tied to one or more of a credit card, a loyalty card and a bank account. A preferred embodiment of a combination of non-cash payment devices is an online membership tied to a loyalty card. Another preferred embodiment of a combination of non-cash payment devices is at least one of an online bank account or reward membership tied to an online shopping mall where incentives are paid to members based on a hierarchy.

The devices are used for making purchases at any of a plurality of merchant locations, of which merchant location 10 is exemplary. Merchant locations may include both physical stores and locations and online merchants and service providers such as online malls and shopping portals.

The debit or credit card includes means for encoding member information thereon, such as by magnetically encoding an account number of the member on a magnetic stripe. By prior arrangement with the network marketing organization, the proprietor of each merchant location agrees to provide a discount for each purchase of goods or services by the member as a proportion of the purchase price of such goods or services, or as a fixed amount per purchase. In addition, in exchange for providing the discount or in consideration for a further discount, the merchant may be provided with opportunities to market its goods or services to the members of the organization, such as by direct mail.

A point-of-sale purchase processing terminal 12 (PPT) is located at location 10. The location may comprise a retail site or an operator taking orders by phone for a catalog or a computer site being used to sell products through a network.

The purchase processing terminal 12 is of a known type including data entry means, such as a keyboard 12a and a magnetic stripe reader 12b, for acquiring data pertaining to a purchase; a digital memory (not shown) for temporarily storing purchase data; and an electronic communication interface, such as a modem 12c, for communicating purchase data and for receiving an authorization signal pursuant to a purchase.

When a member desires to make a purchase in connection with location 10, the member provides his or her debit card for entering the member's account number into the memory of the purchase processing terminal 12 via the magnetic strip reader 12b, which may be a non-cash payment device. The amount of the purchase is entered into the memory of the POS terminal via the keyboard 12a (or other data entry means, such as a barcode scanner). The terminal 12 is then operative to activate the electronic communication interface 12c to establish an electronic data connection 13 with a debit authorization and transaction processor 14. In embodiments wherein the communication interface 12c comprises a modem, the data connection 14 may be a telephonic connection or may comprise a connection via the Internet, as indicated at 13a, or other data transmission method. In other embodiments, alternative known methods of electronic data transmission may be employed to establish the data connection 13. The purchase processing terminal 12 is operative to transmit purchase data, including the member account number, the amount of the purchase, and the identity of the merchant, to the authorization and transaction processor 14. The processor 14 is preferably located a remote location relative to the respective merchant locations, and is further configured to establish electronic data connections with each of the merchant locations. The processor 14 is operative for receiving purchase data and for determining, for each purchase, whether to issue an authorization signal in response to the received purchase data. Such a determination may be made, for example, on the basis of risk data maintained by the processor 14 and relating to the members, for assessing whether there is an acceptably low risk of default on the amount of the purchase. Alternatively, the authorization processor may make such a determination by obtaining access to a member's debit account balance.

If the proposed purchase is approved, the authorization processor 14 transmits an electronic authorization signal along the data connection 13 to the purchase processing terminal 12 at the merchant location 10. The purchase processing terminal 12 in turn, signifies receipt of the authorization signal for the member to make the purchase.

When a purchase is approved by the processor 14, the processor 14 then establishes a data connection 16 with an automated clearing house (ACH) processor 17. The ACH processor 17 is preferably established at a remote location relative to the authorization processor 14. The ACH processor 17 is further connected with an electronic funds transfer network 18 for effecting electronic transfers of funds among a merchant account 20, a member account 21, and an organization or sponsor account 22. In lieu of the ACH processor, funds may be transmitted via other financial processing platforms. For each purchase, the authorization processor 14 instructs the ACH processor 17 to effect the following electronic fund transfers: a debit to the member account 21 in the amount of the purchase, a credit to the merchant account 20 in the amount of the purchase, a debit to the merchant account 20 in the amount of the discount or fixed amount, and a credit to the organization account 22 in the amount of the discount or fixed amount. For example, for a $20 purchase at a merchant having a discount rate of 10%, there will be a debit of $20 charged to the member account 21, a credit of $20 paid to the merchant account 20, and a debit of $2 charged to the merchant account 20, and a credit of $2 paid to the organization account 22.

In addition to instructing the ACH processor 17 to effect transfers of funds, the authorization processor 14 is configured to transmit purchase data to a commission management system 26 maintained by the network marketing organization. The commission management system 26 comprises a commission management processor 27, an electronic database 28 for storing member data and structural data pertaining to the organizational structure of the organization, and a payment processor 29, such as an automated printing and mailing facility, for effecting payment to members. The member data and structural data are stored in the database 28 in the form of a plurality of member records, such as member record 30 shown in FIG. 2. The database 28 is preferably implemented as a structured electronic database in a form compatible with a non-volatile mass data storage device, such as a magnetic disk or tape or other known electronic data storage device B.

Figure 2:
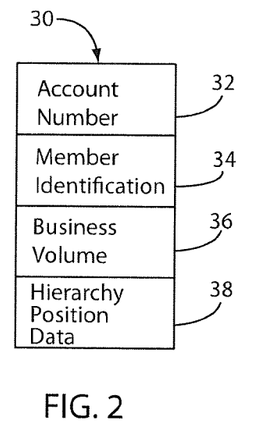
FIG. 2 is a block diagram of an electronic data record maintained in a commission accounting and payment database of the transaction system of FIG. 1.

The member record 30 includes a plurality of data fields, such as an account number field 32 for storing an account number, a member identification field 34 for storing identifying data pertaining to a member (such as the member's name, address, etc.), a Personal Business Volume field 36 for storing a record of purchase discounts, or a portion thereof, attributable to the member's use of the debit card, and a hierarchy position data field 38 for storing data identifying the member's location in a commission distribution hierarchy. Such hierarchy position data may include, for example, points to locations within the mass data storage device of records of other members that are subordinate to the member within the hierarchy, as described further herebelow.

When the authorization processor 14 transmits purchase data to the commission management system processor 27, the commission management processor 27 associates the received member account number with a corresponding member record stored in the database 281. Then the commission management system retrieves the contents of the corresponding Personal Business Volume field 36, adds the incoming purchase discount amount to the retrieved Personal Business Volume, and then stores the new value of the member's Personal Business Volume in the member's record 30 in the database 28.

Figure 3:
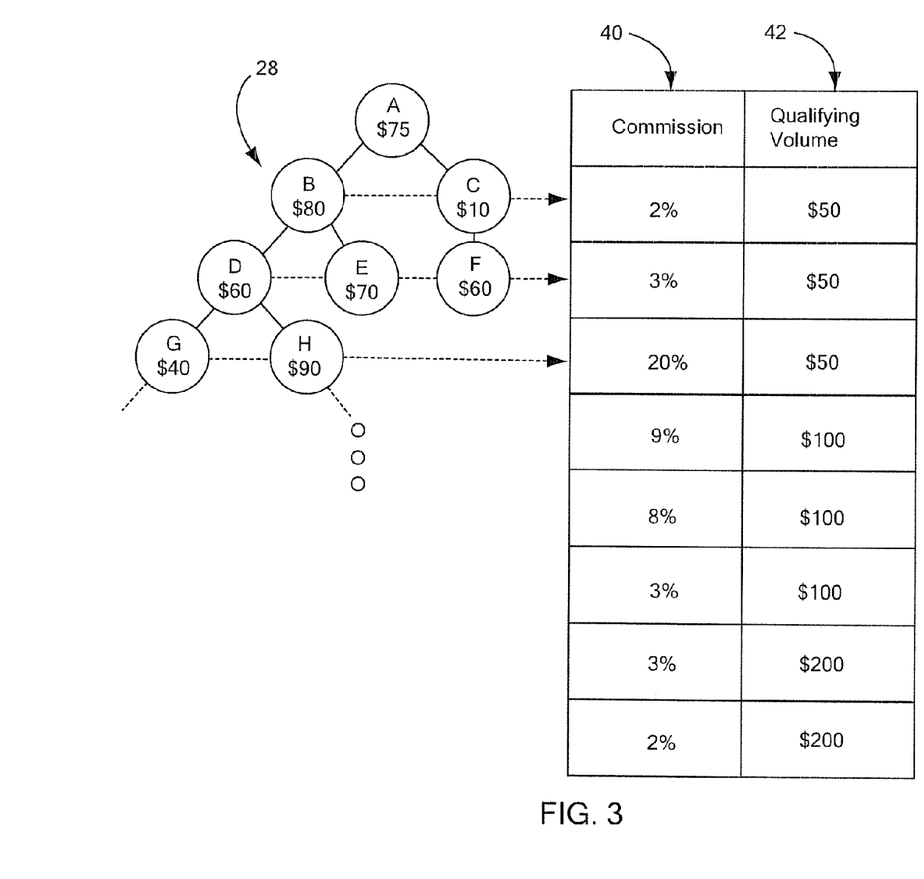
FIG. 3 is a structural diagram of the organization of electronic data records in the commission accounting and payment database.

A structural diagram of relationships among member records within an exemplary database 28 is shown relative to a representative Member A in FIG. 3. The sub-structure comprising the records of Members B-H shall be referred to herein as Member A's "downline network." Relationships within the database 281 are established as follows. When Member A recruits new members to the organization, such new members are established at positions directly subordinate to Member A in the hierarchy. Such new members, for example Members B and C, would indicate the fact of their recruitment by Member A on respective application forms for memberships, or recruitment and placement by an upline sponsor. Established members in the hierarchy are entitled to recruit new members, such that successive generations of members will be established to constitute Member A's downline network.

The hierarchy may be derived from hierarchies present in different multi-level marketing compensation plans. Examples of such different multi-level marketing compensation plans are the Binary plan (illustrated below and in FIG. 4), the Uni-level plan, the Breakaway plan, the Matrix plan, a two-level plan which consists of a two-level hierarchy, a single-level plan, i.e., an Affiliate marketing plan which consists of a single-level hierarchy, and hybrids of these plans.

Figure 4:
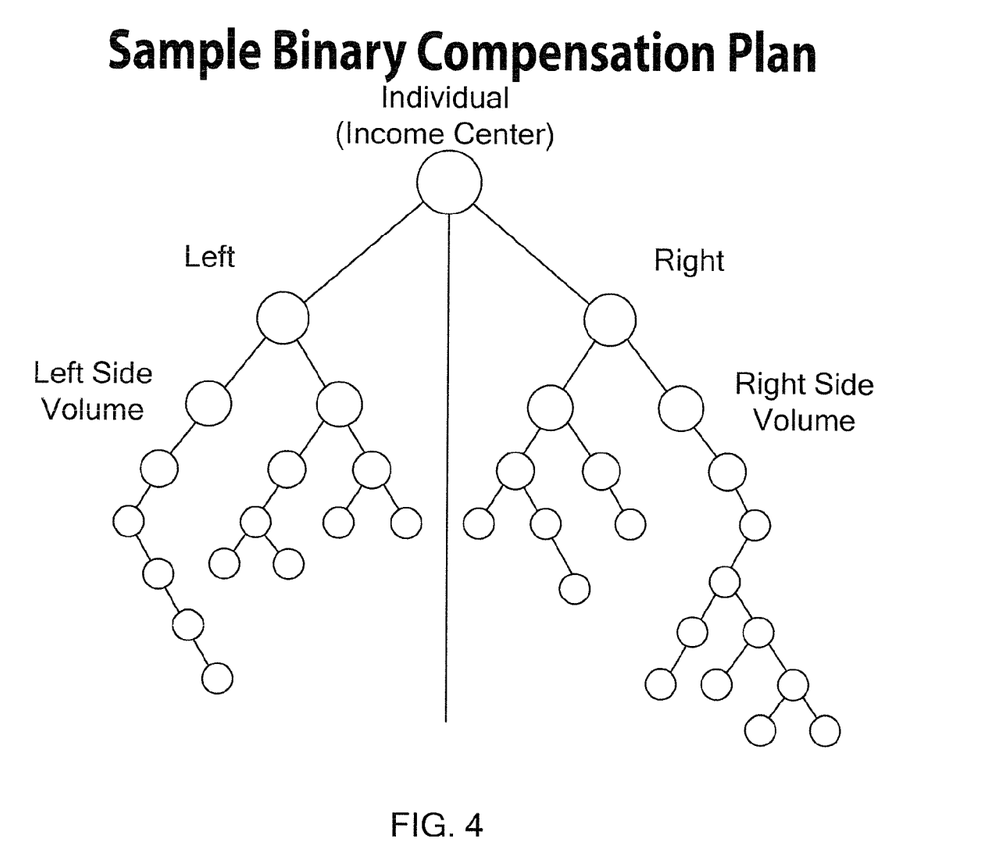
FIG. 4 is a diagram illustrating a sample Binary compensation plan.

The Binary plan is an organizational plan used by multi-level marketing (MLM) organizations wherein members are introduced into a Binary Tree structure, or a left and right subtree. Normally, one subtree is referred to as a Power Leg while the second subtree is a Profit Leg. The Power Leg structure has automatic placement of new members, even by members previously enrolled, or ancestors, to the current member. Since any new members must be placed below their enrolling member, they naturally must fall to an available leaf node of the Binary Tree. Order of placement may be any of Preorder, Inorder or Postorder as determined by either the organization or the enrolling member's nearest ancestor. The Profit Leg of the Binary Tree normally contains those new members who are personally enrolled by the member. Some members below any node on the tree are automatically placed by a member's ancestor, while subordinate members are placed at a specific location in the tree by the member himself or others. Compensation in a Binary plan is based upon a formula dependent upon a certain value of sales in the Power Leg matching up with a certain value of sales in the Profit Leg.

In order to provide an incentive for recruitment of new members and an incentive for members to use the debit card, commissions are paid out of the accumulated discount credits in the organization account 22. Preferably the commissions are paid out at regular intervals, such as weekly, monthly, semi-annually, or annually. In a particularly preferred embodiment, the commissions are paid at monthly intervals. Each member's commission is determined by the commission management processor 27 according to the net Personal Business Volume of the members in his or her downline network. For example, a member's commission may comprise a specified proportion of the net Personal Business Volume of the members on successive levels of his or her downline network in accordance with a schedule 40 associating each successive level of the downline network with a selected proportion for that level. Such a schedule 40 is shown in FIG. 3 adjacent to the exemplary hierarchy. In accordance with the schedule 401 Member A will receive a commission proportional to 2% of the Personal Business Volume of Members B and C, 3% of the Personal Business Volume of Members D, E, and F, and 20% of the Personal Business Volume of members G and H, for a total of $33.50. The schedule of proportions 40 is maintained by the commission management system 26 for reference in computing commissions owed to each of the members at the specified interval A.

As can be appreciated, a variety of commission schedules or multilevel payment plans may be employed in order to optimize the incentives among the members to use the debit cards and to recruit new members. In the future features of the commission management system 26 may be developed to enhance such incentives. As a further incentive to promote use of the debit cards, the payment of commissions can be conditioned on achievement of a specified level of Personal Business Volume to qualify a member for receipt of commissions from successive levels of that member's downline network, according to a graduated scale of qualification threshold values. In the example of FIG. 3, Member A would be required to accumulate $50 of Personal Business Volume in order to qualify for receipt of commissions from the first three levels of his/her downline network, $100 to qualify for the fourth through sixth levels, and $200 to qualify for the seventh and eighth levels. In alternative embodiments, a member's Personal Business Volume can provide a basis for computing a proportional factor for use in combination with the level-dependent schedule 40 of proportions employed to compute that member's commission.

After the commission management processor 27 has determined a commission to be paid to a member, the member identification data and the amount of the commission are transmitted to a payment processor subsystem 29. The determination of the commission may include the use of UPC codes and/or SKU identification, for the purpose of assigning, allocating, administering and awarding discounts from manufacturers, suppliers, distributors or merchants via any of the non-cash transaction devices described herein, and paying cash rewards to consumers. The rewards may be in the form of currency such as United States dollars, Euros, Canadian dollars, Japanese yen or Chinese renminbi. The rewards may be points which can be redeemed for tangible goods, e.g., T-shirts, television sets and groceries. The points can also be redeemed for intangible services such as video rentals, spa treatments and travel. In a preferred embodiment, using a PIN number tied to a cell phone, cell phone number or other member identification data, a member can track his/her Personal Business Volume and the amount of commission accrued. In a preferred embodiment, the payment processor subsystem 29 comprises an automated printer/mailer for printing a commission check to be mailed to the member. In an alternative embodiment, the payment processor subsystem 29 may effect an electronic fund transfer of the commission amount from the organization account 22 to the member account 21, and print a Statement for mailing to the member.

The incentives among the members to use their non-cash payment devices and to recruit new members, also may be used to recruit merchants to participate in entering into discount agreements with the organization. Because the members of the organization would be motivated to use the organizations' payment vehicle in preference to other payment vehicles, and since the members also would be desirous of achieving the requisite Personal business Volume to qualify for increased commissions, the members are more likely to make purchases with merchant participants. To facilitate this incentive, the merchant can be provided with limited access to the organization's database for marketing purposes. For example, aggregate purchase data relating to categories of goods purchased by each member can be maintained by the commission management system in order to allow the merchant to achieve greater promotional efficiency by targeting his or her marketing material to particularly receptive members within the already motivated membership of the organization. Hence, by entering into a discount agreement with the organization, the merchant can also obtain increased marketing efficiency by directing promotional material to an audience that is readily motivated to make purchases from the merchant. For example, the relative frequency with which members purchase sporting goods would be valuable information to a sporting goods merchant desirous of directing his or her promotional material toward motivated consumers of sporting goods. The degree of marketing support provided to the merchant can be made contingent on the magnitude of the discount offered by the merchant.

The terms employed hereabove are terms of description, not limitation, and the scope of the invention is intended to be defined by the following claims and equivalents thereunder. As can be appreciated, the invention is susceptible to variation within the skill of those knowledgeable in the pertinent art. For example, the practice of the invention may be extended to other non-cash payment devices. In such a variation, the term "discount" as used herein would be equally applicable to denote a premium paid by the merchant for conducting a purchase transaction, as well as a discount applied by the merchant to the purchase price. Similarly, the "debit account" of the member would, in such a variation, be applicable to a credit balance to be billed to the member on a basis separate from, or concurrent with, the payment of commissions.

In an alternative embodiment, accumulated commissions may be paid to an account 23 other than the member account 21. For example, the commissions may be paid on behalf of a member to a designated account 23 of a sponsoring organization, such as a charity, union, or fraternal organization, which has arranged to sponsor use of the device, or which has been designated by the member. Similarly, the commissions may be paid on behalf of a majority of or even all of the members to a designated account 23 of a specific sponsoring organization.

In an alternative embodiment, the merchant "location" 10 can be an Internet web server capable of processing e-commerce transactions. In such an embodiment, the "point-of-sale" processing terminal 12 would be a remote computer by which a user may connect via the Internet to the merchant site, select merchandise, and enter appropriate purchase information. Such information would then be relayed to an authorization processor 14, such that the payment device would function as herein otherwise described, with the functions of the processing terminal 12 distributed among the merchant web server and the user's computer or other device capable of establishing a connection to the Internet 13a, such as a personal digital assistant or digital cellular telephone. The merchant location may further comprise a web site depicting Internet merchants, such as an Internet mall which is capable of processing e-commerce transactions.

The merchant server may further comprise a centralized "front end" processor for a plurality of merchants, and/or may relay purchase data to a centralized acceptance or authorization processor serving a plurality of merchants. Operation of the purchase processing terminal would proceed by having the user establish an Internet connection to the merchant server or point-of-sale system, entering the purchase data, and then transmitting the purchase data to an authorization processor.

The invention claimed is:

1. A method of distributing commissions to promote use of a non-cash payment device that is tangible or provides incentives to consumers, said method comprising the steps of:
    organizing an electronic database to contain member records, each member record identifying a bearer of the non-cash payment device;
    establishing a hierarchy of relationships among the member records, and storing positional data in the electronic database in association with the member records;
    operating a purchase processing terminal to record a purchase by one of the members bearing the non-cash payment device at any of a plurality of merchant locations;
    electronically transmitting transaction data from the purchase processing terminal to a commission management processor connected with the electronic database;
    operating the commission management processor to determine, on the basis of the transaction data, a business volume value, and to record the business volume value in a member record identifying said one member;
    determining a commission value for said one member on the basis of business volume values recorded in other member records and on the basis of the positional data relating said one member with the other members in the hierarchy and transmitting that value to a payment processor subsystem; and
    effecting a monetary payment through the payment processor subsystem.

2. The method of claim 1, wherein said establishing step comprises establishing successive subordinate levels of member records relative to said one member within the hierarchy, to identify subordinate members recruited by said one member and to identify further subordinate members at each successive level; and wherein said determining step comprises said commission management processor retrieving member records from each subordinate level and computing said commission value on the basis of the business volume recorded therein for each subordinate member.

3. The method of claim 2, wherein said determining step further comprises computing said commission value on the basis of a schedule of proportions associating proportional commission rates with each successive subordinate level, of the hierarchy.

4. The method of claim 3, wherein said determining step further comprises computing said commission value on the basis of a predetermined schedule of qualifying business volume values.

5. The method of claim 4, wherein said determining step further comprises retrieving and consulting said schedule of qualifying business volume values to determine at least one of (i) a threshold business volume value for payment of a commission to said one member, and (ii) identifying the number of successive subordinate levels from which subordinate member records will be retrieved to determine the commission value.

6. The method of claim 1 wherein said step of operating a purchase processing terminal comprises the steps of:
    establishing an Internet connection between a user terminal and a merchant server;
    entering purchase data into the user terminal; and
    transmitting the purchase data via the merchant server to an authorization processor.

7. The method of claim 1 wherein the non-cash payment device is made or adapted to transmit a purchase or payment and is selected from the group consisting of a computer database, an online membership, an online bank account and a reward membership.

8. The method of claim 1 wherein the merchant locations comprise both physical stores and locations and online merchants and service providers.

9. The method of claim 8 wherein the online merchants comprise online malls and shopping portals.

10. A method of promoting a non-cash payment device that is tangible, said method comprising the steps of
establishing hierarchical relationships among a plurality of members bearing non-cash payment devices, said hierarchical relationships selected from the group consisting of the hierarchical relationships of the Binary plan, the Uni-level plan, the Breakaway plan the Matrix plan, a two-level plan, a single-level plan, and hybrids of the plans;
recording the hierarchical relationships established among the members as positional data within an electronic database maintained by a commission management processor;
conducting electronic purchase transactions by members using the non-cash payment devices via an Internet connection to a merchant server, and electronically transmitting purchase data to the commission management processor;
determining by the commission management processor, a commission value for each member on the basis of (i) the purchase data pertaining to the electronic purchase transactions made by other members, and (ii) the positional data relating each member to the other members in the electronic database and transmitting that value to a payment processor subsystem; and
effecting through the payment processing system an electronic fund transfer of a monetary payment in the amount of the commission value.

11. A method of distributing commissions to promote use of a non-cash payment device that is tangible, said method comprising the steps of:
organizing an electronic database to contain member records, each member record identifying a bearer of the non-cash payment device;
establishing a hierarchy of relationships among the member records, and storing positional data in the electronic database in association with the member records; and
establishing an Internet connection or data transmission method between a member terminal and a merchant server which comprises a centralized front-end processor for a plurality of merchants and/or relays purchase data to a centralized acceptance or authorization processor serving a plurality of merchants;
operating the merchant server to record a purchase by one of the members bearing the non-cash payment device;
electronically transmitting transaction data from the merchant server, or point-of-sale system, to a commission management processor connected with the electronic database;
operating the commission management processor to determine, on the basis of the transaction data, a business volume value, and to record the business volume value in a member record identifying said one member;
determining a commission value for said one member on the basis of business volume values recorded in other member records and on the basis of the positional data relating said one member with the other members in the hierarchy;
providing member access to the business volume value and commission value; and
effecting a monetary payment in the amount of the commission value to said one member.

12. The method of claim 1, wherein the tangible device is made or adapted to transmit a purchase or payment and is selected from the group consisting of a debit or credit card, a smart card with or without a chip, a hand-held device, a cellular phone, a portable transmitter, a voucher or a loyalty card.

13. The method of claim 1, wherein the hierarchy is derived from the Binary plan.

14. The method of claim 1, wherein the business volume value and commission value are accessible to a member.

15. The method of claim 1, wherein the determination of the commission includes the use of UPC codes and/or SKU identifications.

16. The method of claim 12, wherein the tangible device is selected from a cellular phone and a portable transmitter.

17. The method of claim 13, wherein the smart card comprises a chip.

18. The method of claim 12, wherein the tangible device is a voucher.

19. The method of claim 12, wherein the tangible device is selected from a cellular phone and a portable transmitter.

20. The method of claim 1, wherein the tangible device is capable of being grasped by the mind and is selected from a computer database, an online membership and an online bank account.

21. The method of claim 1 wherein the tangible device is made or adapted to transmit a purchase or payment and is selected from a combination of an online membership and one or more of a computer database, an online bank account, a reward membership, a debit or credit card, a smart card with or without a chip, a hand-held device such as a cellular phone, a portable transmitter, a voucher and a loyalty card.

22. The method of claim 1 wherein the tangible device is made or adapted to transmit a purchase or payment and is selected from a combination of at least one of a cellular phone and a wireless device and one or more of a credit card, loyalty card and a bank account.

23. The method of claim 1, wherein the tangible device is made or adapted to transmit a purchase or payment and is selected from a combination of a cellular phone and one or more of a credit card and a loyalty card.

24. The method of claim 1, wherein the tangible device is made or adapted to transmit a purchase or payment and is selected from a combination of an online membership tied to a loyalty card.

25. The method of claim 1, wherein the tangible device is made or adapted to transmit a purchase or payment and is selected from a combination of at least one of an online bank account or reward membership and an online shopping mall where incentives are paid to members based on a hierarchy.

* * * * *